3,694,337
SPUTTERING METHOD FOR MANUFACTURING TRANSPARENT, HEAT RAY REFLECTING GLASS
Akira Kushihashi, Nishinomiya, and Seiichiro Manabe, Itami, Japan, assignors to Nippon Sheet Glass Co., Ltd., Osaka, Japan
Filed Jan. 4, 1971, Ser. No. 103,716
Int. Cl. C23c 15/00
U.S. Cl. 204—192                 1 Claim

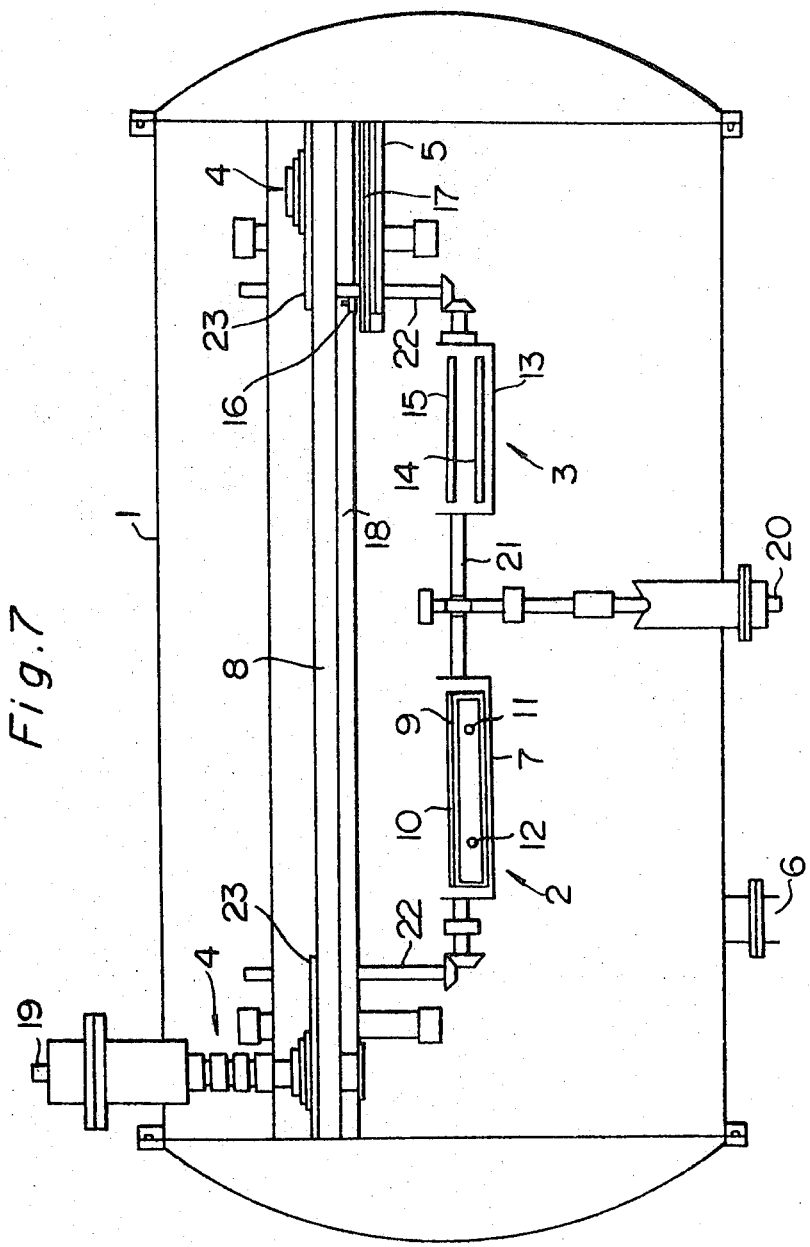

ABSTRACT OF THE DISCLOSURE

A transparent, heat ray reflecting glass article comprising a glass sheet on at least one surface of which a heat ray reflecting coating is formed, said heat ray reflecting coating comprising a first layer consisting essentially of a copper-nickel alloy containing 5–15% by weight of nickel, and a second layer composed of an oxide of said alloy, which is tightly bonded on said first layer, and a process for preparation of the same.

---

This invention relates to a transparent, heat ray reflecting glass article comprising a heat ray reflecting coating comprising a first layer of a copper-nickel alloy and a second layer of an oxide of said alloy bonded on the first layer, and to a process for the preparation of such glass article.

Glasses comprising a semi-transparent coating of a noble metal, especially gold, silver or copper, have a high heat ray reflecting property. Among these glasses, there have been broadly utilized multiple sheet glasses comprising a glass sheet having a thin coating of gold or silver on one surface thereof and an ordinary glass sheet in which both sheets are piled with a void therebetween so that the coated surface of the coated sheet faces to the void and in which the peripheries of the sheets are sealed; and laminated glasses comprising a glass sheet having such thin coating of gold or silver and an ordinary glass sheet confronting each other with an intermediate polyvinyl butyral layer bonding both sheets so that the coated surface of the coated sheet faces the intermediate polyvinyl butyral layer. In such glass sheets the thin coating of gold or silver has a good durability. However, in glass sheets having a thin coating of copper have not been actually utilized because of poor chemical resistance of the thin coating of copper. Namely, the thin coating of copper is gradually allowed to change chemically to copper oxide by the presence of a small amount of water and the action of heat, which results in decline of optical properties of the coating.

As a result of our research we have now found that when a thin coating of a copper-nickel alloy containing 5–15% by weight of nickel is applied on the surface of a glass sheet, the optical properties of the resulting coating, particularly the heat ray reflecting property, are almost equal to those of a thin coating composed of copper alone and the coating of the copper-nickel alloy is superior to the coating of copper alone with respect to the heat resistance and moisture resistance; and that when the surface portion of said heat reflecting coating of such copper-nickel alloy is converted in advance to a layer of an oxide of said alloy, the durability of the heat ray reflecting coating can be highly improved. Based on these findings, we have arrived at this invention.

In accordance with this invention, there is provided a transparent, heat ray reflecting glass article comprising a glass sheet on at least one surface of which a heat ray reflecting coating is formed, said heat ray reflecting coating comprising a first layer consisting essentially of a copper-nickel alloy containing 5–15% by weight of nickel, and a second layer composed of an oxide of said alloy, which is tightly bonded on said first layer.

Figure 1:
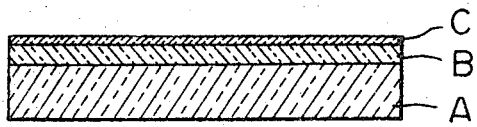
Figure 2:
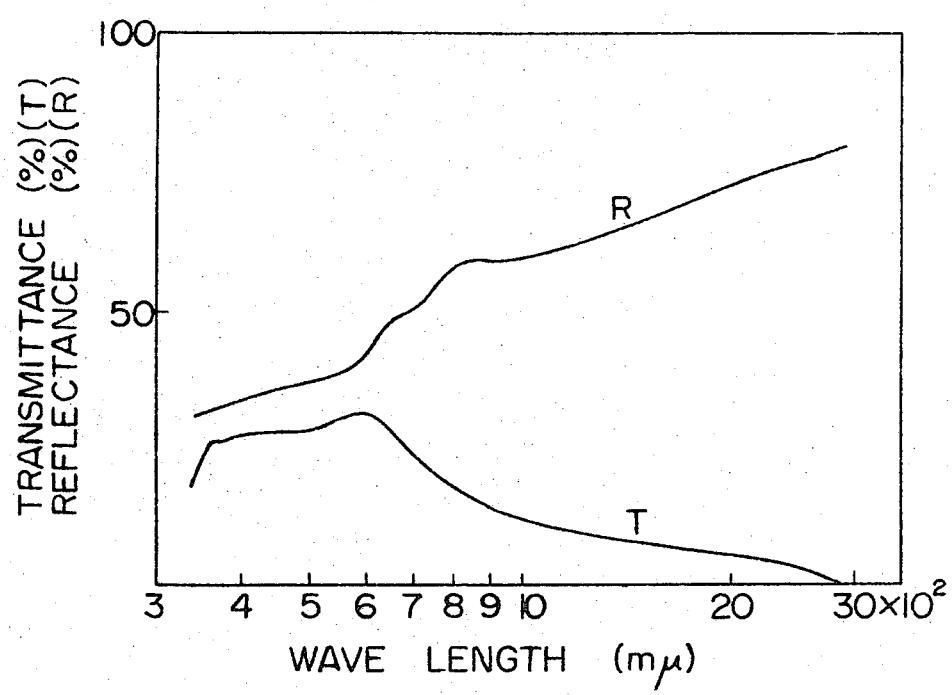
Figure 3:
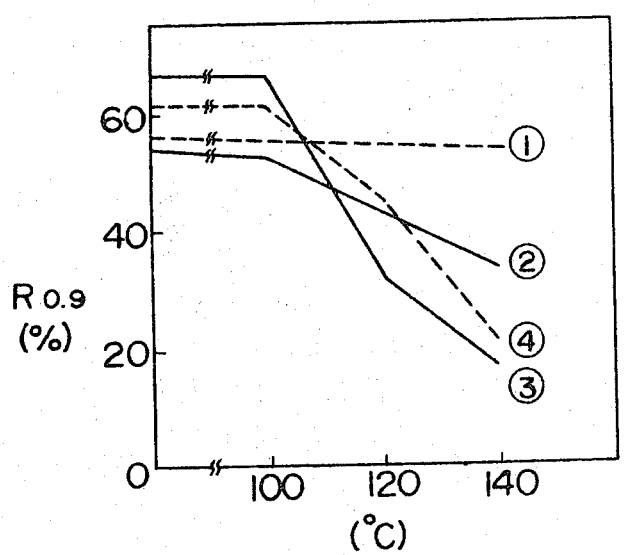
Figure 4:
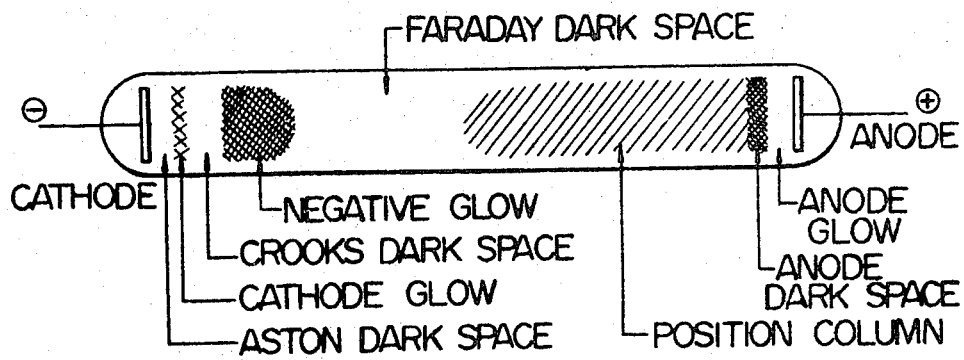
Figure 5:
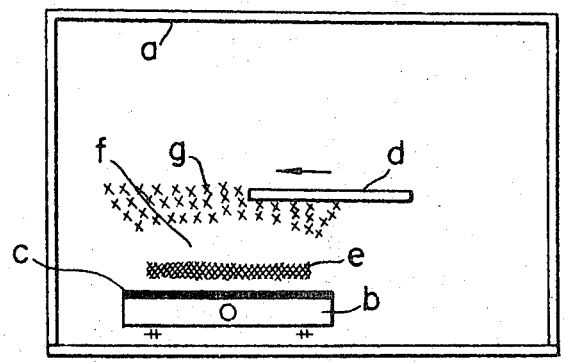
Figure 6:
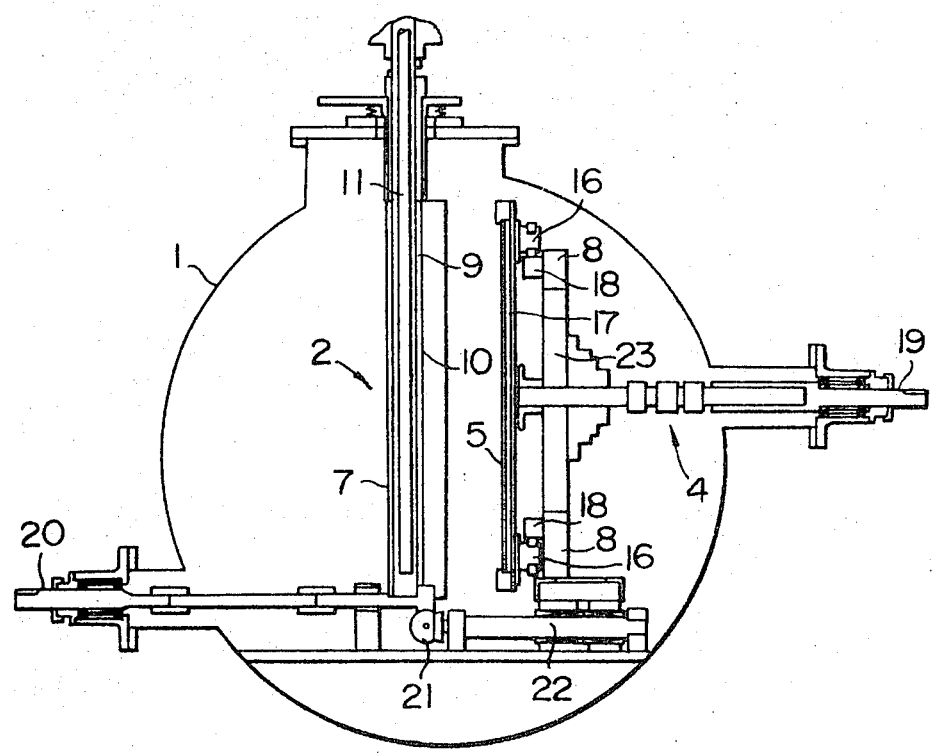

This invention will now be detailed by referring to accompanying drawings, wherein FIG. 1 is an enlarged sectional view illustrating the sectional structure of the transparent, heat ray reflecting glass of this invention, FIG. 2 shows curves illustrating optical properties at infrared and visible portions of a laminated glass prepared with use of the transparent, heat ray reflecting glass of this invention, FIG. 3 shows graphs illustrating the reflectance at near infrared portion of the transparent, heat ray reflecting glass of this invention and those of heat ray reflecting glass sheets outside the scope of this invention, both of which have been subjected to the accelerating weatherability test, FIG. 4 is a view explaining the states of zones formed during the glow discharge which is utilized in the manufacture of the heat reflecting glass of this invention, FIG. 5 is a view illustrating the utilization of the glow discharge in the manufacture of the heat ray reflecting glass of this invention, FIG. 6 is a side view in the longitudinal section of a sputtering apparatus used in the manufacture of the heat ray reflecting glass of this invention, and FIG. 7 is a plan view in the cross section of the apparatus of FIG. 6.

Referring to FIG. 1, the transparent, heat ray reflecting glass of this invention comprises a sheet-like glass substrate A, a first layer B of a copper-nickel alloy tightly bonded to at least one surface of the glass substrate, and a second layer C of an oxide of said alloy bonded tightly to the first layer B.

In this invention it is especially important that the thin coating formed on the surface of the glass is composed of a copper-nickel alloy containing 5–15% by weight of nickel. If this requirement is not satisfied, it is impossible to obtain a glass article sufficient in both the chemical resistance and the heat ray reflecting property. More specifically, in case the coating formed on the glass surface is composed of an alloy whose nickel content is less than 5% by weight, the chemical resistance of the coating is insufficient, and if the nickel content exceeds 15% by weight, the optical properties, particularly the heat ray reflecting property, are extremely low.

The critical feature of this invention resides in a novel knowledge that a copper-nickel alloy of the above specific composition is excellent in the heat ray reflecting property and when the surface portion of the coating of said alloy is oxidized in advance, a protective coating layer excellent in the durability is formed without any decline of said excellent heat ray reflecting property.

In the heat ray reflecting coating according to this invention, the thickness of the coating is not particularly critical, but in general it is preferred that the thickness of the coating as a whole is within a range of from 100 A. to 500 A. In case the thickness of the heat ray reflecting coating is less than 100 A., the heat reflecting activity is lowered. On the other hand, if the thickness is greater than 500 A., the light transmittance decreases and there is a tendency that the resulting glass article becomes dark. Generally, it is preferred that the thickness of the second layer of an oxide of said copper-nickel alloy formed on the first layer composed of said copper-nickel alloy is within a range of from 5 A. to 100 A. In case the thickness of the alloy oxide layer is less than 5 A., the durability of the thin coating is inferior and cannot act sufficiently as the protective coating layer. In case the thickness of the alloy oxide layer is greater than 100 A., there appears a decline of the heat ray reflecting property of the coating. In this invention it is generally desired that the thickness of the copper-nickel alloy oxide layer is $1/20$–$1/5$ of the whole thickness of the heat ray reflecting coating.

Glass sheets provided with such heat ray reflecting coating are characterized by a visible ray transmittance of 15–40%, a total solar energy reflectance of 30–50% and a total solar energy absorption of 30–45%.

Formation of the heat ray reflecting coating on the glass substrate may be accomplished by an optional method. For instance, the surface of a glass substrate is cleansed by a method known per se and a thin coating of a copper-nickel alloy is applied on the cleansed surface of the glass substrate by a conventional method such as sputtering method, vacuum plating method and non-electrolytic palting (method comprising reducing a metal salt on the glass surface with a reducing agent and thereby depositing the metal on the glass surface). The sputtering method is excellent with respect to the strength of the bonding of the resulting thin coating and the glass substrate, and the reproducibility of formation of the thin coating. The formation of a thin layer of a copper-nickel alloy oxide on the coating of the copper-nickel alloy is accomplished by a technique of depositing the alloy oxide on the thin layer of the copper-nickel alloy or another technique of oxidizing the surface portion of the copper-nickel alloy thin layer. The former technique includes the vacuum plating method and the reactive sputtering process, and the latter technique includes the chemical oxidation method of heating the alloy coating in an oxygen atomsphere, the anode oxidation method, and the glow discharge oxidation method using oxygen gas. In the case of a glass substrate of a great area, in view of the easiness of operation and the uniformity of the oxide layer, it is preferable to conduct the formation of the oxide layer by the glow discharge method using oxygen gas.

In one preferable embodiment of this invention, there is provided a process for the manufacture of heat ray reflecting glass articles, which comprises subjecting a surface-cleansed glass sheet to sputtering in an inert atmosphere of a reduced pressure with use as target of a copper-nickel alloy containing 5–15% by weight of nickel, thereby to form a thin coating of said alloy having a thickness of 100–500 A. on at least one surface of the glass sheet, and maintaining the glass sheet having the so formed thin coating of the alloy in an oxygen gas of a reduced pressure under the glow discharge, thereby to oxidize the surface portion of said alloy thin coating.

A suitable apparatus for use in the practice of the above embodiment of this invention is detailedly explained in the specification of copending U.S. application Ser. No. 851,286.

In this invention the formation of a copper-nickel alloy coating by sputtering is conveniently performed by maintaining the glass sheet in the negative glow zone. As is shown in FIG. 4, there are formed the following eight zones between the cathode and anode during the glow discharge; Aston dark space, cathode glow, Crooks dark space, negative glow, Faraday dark space, positive column, anode glow and anode dark place. Results of our experiments where a glass sheet was positioned in each of said eight zones and the state of the coating formation was observed are summarized as follows:

The formation of the coating in zones of cathode, Aston dark space, cathode glow and Crooks dark space shown in FIG. 4 is poor. When the sputtered metallic particles are caused to strike the surface of the glass sheet in these zones, ions formed are less and the formation of secondary electrons and photon cations by which the self-discharge of ions formed is maintained does not take place normally, with the result that the rate of formation of the coating is low. Further, the thickness of the resulting coating is not uniform, the coating at the marginal portion of the glass sheet being thick while that in the middle portion is thin. In addition, primary and secondary electrons are accumulated on the surface of the glass sheet, which is an insulator, to set up a discharge along the surface to cause cracks to occur in the coating. It was confirmed that excellent results are obtained when the glow discharge is effected while positioning the glass sheet in the negative glow zone. On the other hand, the results of experiments conducted in the Faraday dark space zone and subsequent zones are not satisfactory. That is to say, coatings formed on the glass surface in these zones are not uniform in the thickness, the marginal portion being thin. It was also confirmed that the coatings formed in these zones have such defects as weak bonding strength, uneven spotted deposition and poor heat resistance.

As already described, it was confirmed that an excellent coating is formed in the negative glow zone. Hence, various inquiries were made on the negative glow. The occurrence of the negative glow is controlled by the degree of vacuum in the system, the kind of the gas, the kind of the target and the voltage impressed between electrodes. The particles making up the coating formed in the negative glow zone are very fine, the size of which is about one-twentieth to one-fiftieth of the size of particles of a coating obtained by the vacuum plating. Accordingly, reaggregation of metal particles by heat does not take place, and hence, there is not brought about a decline in optical properties. Thus, the heat ray reflecting glass whose coating is formed by the above procedure is conveniently submitted to secondary processing for making a multiple sheet glass or a laminated glass. Since in the negative glow zone the coating is formed for a very short period of time and the sectional area of collision of the metal particles of high energy that have been sputtered is small, the amount of the gas absorbed in the resulting coating is small. Thus a coating comparable to the coating obtained by high vacuum plating can be obtained with uniform thickness without unduly increasing the size of the target. Further, there is attained another advantage that the deposition ratio of the metal particles is high.

The foregoing explanation relates to an embodiment where a glass sheet is positioned to face the target. In the case of a glass sheet of a large size, it is convenient to move the glass sheet about in the negative glow zone. This embodiment is shown in FIG. 5. A frame or outer wall of a vacuum vessel is made to act as anode $a$, and a water-cooled cathode $b$ and a traget $c$ are disposed inside the vessel adjacent to one of the end walls. The zones of cathode glow $e$, Crooks dark space $f$ and negative glow $g$ are formed as a result of an electric discharge. Sheet glass $d$ is moved within the negative glow zone $g$ in the direction indicated by the arrow in the drawings. As described above, when the sheet glass $d$ is passed through the cathode glow zone $e$ or Crooks dark space zone $f$, the resulting coating is not satisfactory. Again, satisfactory results are not obtained when the sheet glass $d$ is positioned in the Faraday dark space zone and subsequent zones. In this embodiment, good results are obtained only when the sheet glass is moved about only within the negative glow zone $g$.

The composition of an alloy used as target should be the same as that of the copper-nickel alloy deposited on the glass surface. Namely, the target alloy is also a copper-nickel alloy containing 5–15% by weight of nickel. The voltage impressed between the cathode and anode is preferably 4–7 kv. in the case of a direct current and in the case of a high frequency current it is preferred to impress a voltage of 1–4 kv. In case the impressed voltage is lower than 4 kv. in the case of a direct current or lower than 1 kv. in the case of a high frequency current, the degree of deposition of the metal particles is low and the optical properties of the resulting metal coating tend to decline. In case the impressed voltage is higher than 7 kv. in the case of a direct current or higher than 4 kv. in the case of a high frequency current, the glass substrate is damaged by ions colliding therewith.

It is generally preferred that the degree of vacuum in the vessel at the time of forming an alloy coating is such that the pressure of an inert gas used is within a range of $1.5 \times 10^{-2}$ to $5 \times 10^{-2}$ torr. At the inert gas pressure lower than $1.5 \times 10^{-2}$ torr, a stable glow discharge is not attainable, and at the inert gas pressure exceeding $5 \times 10^{-2}$ torr, the means free path of the ion is short and there appears a tendency of decline in the sputtering efficiency.

The glass sheet on which a thin coating of a copper-nickel alloy having a thickness of 100 A. to 500 A. has been thus formed by the above-mentioned procedures is then maintained in a glow discharge area with use of an oxygen gas of a reduced pressure, whereby the surface portion of the alloy coating is oxidized.

For the same reasons as described above with respect to the sputtering step, it is preferred that in the glow discharge oxidation the degree of vacuum in a vessel is such that the pressure of the oxygen gas used is within a range of $1.5 \times 10^{-2}$ torr to $5 \times 10^{-2}$ torr. It is also preferred that the voltage impressed between the cathode and anode is higher than 0.5 kv. At the impressed voltage lower than 0.5 kv., the rate of oxidation is decreased. It is advantageous to use an alternating current in the glow discharge oxidation.

The process of this invention is conveniently practised by using an apparatus illustrated in FIGS. 6 and 7.

As is seen from FIGS. 6 and 7, the apparatus comprises a vacuum vessel 1 housing a sputter means 2, an ion bombardment device 3 and a sheet glass transporting mechanism 4. Vacuum vessel 1 is provided with an exhaust port 6, to which is connected a gas exchanger (not shown). Sputter means 2 is made up of a flattened U-shaped anode 7 in which is affixed a cathode 9 through the intermediary of insulators (not shown), and a copper-nickel alloy target 10 mounted to the surface of cathode 9 at the open side of anode 7. Cathode 9 has a hollow structure, through which is circulated cooling water entering and leaving via pipes 11 and 12 to cool cathode 9 and target 10. Ion bombardment device 3 is composed of a flattened U-shaped shield plate 13 in which are disposed a pair of annular aluminum ion bombardment electrodes 14 and 15 through the intermediary of insulators (not shown), electrodes 14 and 15 being cooled by circulation of water through their hollow interior. The clearance between shield plate 13 and ion bombardment electrode 14 is made less than the mean ion path at the degree of vacuum used so as to ensure that discharge does not take place is this clearance. Sheet glass transporting mechanism 4 is made up of a wheel-equipped mounting rack 17 for sheet glass 5 and rail 18. By rotation of a drive shaft 19 a chain 8 which is in engagement with sprocket wheels 23 is driven, whereby glass mounting rack 17 is allowed to move over rails 18 in front of ion bombardment device 3 and sputter means 2 in parallel thereto. By rotation of a sheet glass position adjusting shaft 20, traverse shafts 21 and position regulating shafts 22 are rotated in turn and the position of rails 18 are changed. As a result, it is possible to change the distance from cathode 9 of glass sheet 5 which passes in front of sputter means 2.

In conducting the process of this invention, a sheet glass 5 is mounted to glass mounting rack 17 in vacuum vessel 1 and then the inside of vacuum vessel 1 is exhausted to a vacuum of less than $1 \times 10^{-4}$ torr via exhaust port 6. Next, argon gas is introduced into vacuum vessel 1 by means of a gas exchanger connected to exhaust port 6 and the pressure is adjusted to $2-4 \times 10^{-2}$ torr. Then shield plate 13 is grounded and an alternating current of 2–3 kv. is impressed to water-cooled ion bombardment electrodes 14 and 15. And shaft 19 is rotated so as to cause sheet glass 5 to pass in front of these electrodes 14 and 15. Thus the surface of sheet glass 5 on which an alloy coating is to be formed is cleansed by ion bombardment as the glass sheet passes in front of electrodes 14 and 15.

Next, the pressure inside vacuum vessel 1 is readjusted to about $3 \times 10^{-2}$ torr, and anode 7, side walls of vacuum vessel 1 and mounting rack 17 are grounded to reduce the potential to zero. Then a direct current of $-6$ kv. is impressed to cathode 9 cooled by water circulating through pipes 11 and 12. At this time a glow discharge does not take place at the space enclosed by anode 7 and cathode 9 because of the smallness of the clearance. However, at the open side of anode 7 a discharge takes place between either the side walls of vacuum vessel 1 or glass mounting rack 17 and cathode 9 below copper-nickel alloy target 10. This state is as shown in FIG. 5. When this is considered with reference to FIG. 7, in the direction proceeding from target 10 to sheet glass 5 the cathode glow zone appears first adjacent to target 10, which is then followed by the Crooks dark space zone and the negative glow zone in the order given. In this invention, sheet glass 5 is passed through this negative glow zone. Thus an excellent coating of a copper-nickel alloy is formed on the surface of the glass sheet.

Next, the argon atmosphere inside vacuum vessel 1 is replaced by an oxygen gas so that pressure of the oxygen gas is adjusted to $5 \times 10^{-2}$ and an alternating current higher than 0.5 kv. is impressed between electrodes 14 and 15. And the glass sheet provided with a thin coating of the copper-nickel alloy is passed through a glow discharge zone formed in front of electrodes 14 and 15. Thus a layer of an oxide of the alloy is formed on the surface portion of the copper-nickel alloy coating.

This invention will now be explained by referring to a working example.

An ordinary sheet glass, the surface of which has been cleansed by polishing or the like, is taken into an apparatus shown in FIGS. 6 and 7, and the air is discharged from the apparatus so that the inside pressure will be lower than about $1 \times 10^{-4}$ torr. Then argon is introduced so that the argon atmosphere of a pressure of $2 \times 10^{-2}$ to $4 \times 10^{-2}$ torr will be maintained. An alternating current of 3 kv. is impressed between a pair of aluminum electrodes and the glass surface is cleansed by the resulting glow discharge of the argon gas. Then the inside pressure is adjusted to $4 \times 10^{-2}$ torr and a direct current of 6 kv. is impressed with using as target a copper-nickel alloy plate consisting of 90% by weight of copper and 10% by weight of nickel. The preliminary sputtering is effected for about 5 minutes and the surface of the target is cleansed, following which the sputtering is conducted for 30 seconds while adjusting the distance between the target and the glass sheet to 80 mm. Thus on the glass surface is deposited a semi-transparent coating of a thickness of about 250 A., composed of 90% by weight of copper and 10% by weight of nickel. Then, the atmosphere inside the vacuum vessel is replaced by an oxygen gas so that the oxygen gas pressure will be $2 \times 10^{-2}$ to $3 \times 10^{-2}$ torr, and an alternating current of 3 kv. is impressed between the above-mentioned aluminum electrodes. The glass sheet is maintained in the glow discharge of the oxygen gas for about 12 seconds, whereby the surface portion (about 10 A.) of the coating of the alloy composed of 90% by weight of copper and 10% by weight of nickel is converted to an oxide of said alloy. A laminated glass prepared by using the so formed glass sheet exhibits a visible ray transmittance of 26.5%, a total solar energy reflectance of 41.1% and a total solar energy absorption of 41.4%. Spectral transmittance T and spectral reflectance R of this laminated glass are shown in FIG. 2.

The thin coating 1 obtained in accordance with the above example of this invention, a thin coating 2 of an alloy consisting of 90% by weight of copper and 10% by weight of nickel, the surface portion of which is not oxidized, a thin coating 3 composed of copper alone, and a thin coating 4 of copper, the surface portion of which is oxidized, are heated at various temperatures for 30 minutes and the decrease of near infrared reflectance at wavelength of 900 m$\mu$ is determined with respect to each coating. The results are plotted on FIG. 3.

As is seen from FIG. 3, the thin coating formed by the process of this invention is very superior to conventional coatings with respect to the heat resistance. When the above four coatings are polished under a load of 1 kg./cm.$^2$ for 10 minutes with use of a commercially available polishing agent (sold under the trade name "Glaster") to determine the abrasion resistance of these coatings, any damage is hardly observed with naked eye in the coating according to this invention, whereas in other coatings the coated layer is completely peeled off by the above polishing treatment.

To determine water resistance, these coatings are dipped in water of room temperature for 12 hours. The coating according to this invention is only slightly damaged, while other coatings are completely dissolved in water during the above treatment.

As is seen from the foregoing, the layer of the alloy oxide formed on the surface portion of the copper-nickel alloy coating according to this invention acts as a layer protecting the alloy coating and preventing diffusion of water, oxygen and other substance intruding from the outside. Further, the layer of the alloy oxide per se is chemically and thermally stable, and hence, the durability of the heat ray reflecting coating is highly improved. Accordingly, in this invention, the heat resistance, water resistance and abrasion resistance of the heat ray reflecting coating can be highly improved by provision of such thin layer of the alloy oxide without any substantial decline of optical properties, especially the heat reflecting property.

What we claim is:

1. A process for the manufacture of heat ray reflecting glass articles which comprises subjecting a surface-cleansed glass sheet to sputtering in an inert atmosphere of a reduced pressure with use as target of a copper-nickel alloy containing 5–15% by weight of nickel, thereby to form a thin coating of said alloy having a thickness of 100–500 A. on at least one surface of the glass sheet, and maintaining the glass sheet having the so formed thin coating of the alloy in an oxygen gas of a reduced pressure under the glow discharge, thereby to oxidize the surface portion of said alloy thin coating.

References Cited

UNITED STATES PATENTS

| | | | |
|---|---|---|---|
| 2,920,002 | 1/1960 | Avwarter | 204—192 |
| 2,962,389 | 11/1960 | Menke | 117—124 C |
| 3,076,727 | 2/1963 | Harwig | 117—211 |
| 3,126,295 | 3/1964 | Young | 117—33.3 |
| 3,414,503 | 12/1968 | Brichard | 204—192 |
| 3,537,944 | 11/1970 | Grubb et al. | 161—196 |

JOHN H. MACK, Primary Examiner

S. S. KANTER, Assistant Examiner

U.S. Cl. X.R.

117—71, 124 C; 161—196